(12) United States Patent
Rothe et al.

(10) Patent No.: US 8,515,149 B2
(45) Date of Patent: Aug. 20, 2013

(54) INSPECTION SYSTEM AND METHOD FOR DETERMINING THREE DIMENSIONAL MODEL OF AN OBJECT

(75) Inventors: Nils Rothe, Hannover (DE); Alexander Suppes, Garbsen (DE); Eberhard Neuser, Wunstorf (DE)

(73) Assignee: General Electric Company, Schenectady, NY (US)

( * ) Notice: Subject to any disclaimer, the term of this patent is extended or adjusted under 35 U.S.C. 154(b) by 54 days.

(21) Appl. No.: 13/218,825

(22) Filed: Aug. 26, 2011

(65) Prior Publication Data

US 2013/0051654 A1 Feb. 28, 2013

(51) Int. Cl.
*G06K 9/00* (2006.01)
*G06K 9/34* (2006.01)

(52) U.S. Cl.
USPC .......................................... 382/131; 382/173

(58) Field of Classification Search
USPC .................. 382/100, 131, 154, 173, 199, 266
See application file for complete search history.

(56) References Cited

U.S. PATENT DOCUMENTS

| 6,816,619 | B2 * | 11/2004 | Tlaskal et al. | 382/240 |
| 2004/0240749 | A1 * | 12/2004 | Miwa et al. | 382/274 |
| 2004/0247179 | A1 * | 12/2004 | Miwa et al. | 382/173 |
| 2008/0193013 | A1 * | 8/2008 | Schiwietz et al. | 382/173 |
| 2010/0118027 | A1 | 5/2010 | Weiss | |

FOREIGN PATENT DOCUMENTS

WO WO-98/39736 9/1998

* cited by examiner

*Primary Examiner* — Shefali Goradia
(74) *Attorney, Agent, or Firm* — Hiscock & Barclay LLP (57) ABSTRACT

Embodiments of a system and method are described that automate processes to reconstruct models from two-dimensional images. In one embodiment, the systems comprise an apparatus that can acquire a plurality of images of an object and automatedly form a boundary about the object in each of the images. The boundary highlights a portion of the image that will form the basis for the model. The apparatus can also select a primary image from the images, wherein the boundary in the primary image is narrowest relative to an axis that is common to each of the images. In one example, the apparatus can select a secondary image, which is perpendicular to the primary image, and reconstruct the primary image and the second image to generate the model.

20 Claims, 5 Drawing Sheets

INSPECTION SYSTEM AND METHOD FOR DETERMINING THREE DIMENSIONAL MODEL OF AN OBJECT

BACKGROUND OF THE INVENTION

The subject matter disclosed herein relates to non-destructive testing and, more particularly, to systems and methods that perform volume reconstruction using two-dimensional images.

Non-destructive testing can be done by testing systems that may deploy equipment to inspect the interior of parts. Examples of this equipment include computed-tomography (CT) scanners, ultrasonic scanners, X-ray scanners, and magnetic resonance inspection (MRI) scanners. Many of these scanners generate images of the part. These images permit visual inspection of the part without the need to disrupt the structural integrity of the part-under-inspection.

Many testing systems require an end user to identify regions of the part for analysis. The systems often have a computing device with a display that displays an interface, e.g., a graphical user interface (GUI). The interface presents one or more images to the end user and, in some cases, provides selectable tools that the end user can use to locate the region relative to the part.

The discussion above is merely provided for general background information and is not intended to be used as an aid in determining the scope of the claimed subject matter.

BRIEF DESCRIPTION OF THE INVENTION

An inspection system is disclosed, wherein the inspection system has features and components that facilitate reconstruction of a model from images of an object. An advantage that may be realized in the practice of some disclosed embodiments of the inspection system is to reduce the computing and memory resources necessary to generate the model.

In one embodiment, an inspection system is described that comprises an apparatus with a processor, a memory coupled to the processor, and one more executable instructions stored on the memory and configured to be executed by the processor. The one or more executable instructions include instructions for acquiring a plurality of images of an object and for segmenting one or more of the images to obtain segmented images comprising predominantly pixels that define the object in the image. The executable instructions also include instructions for placing a boundary about the object in the segmented images and for selecting a primary image from the segmented images in which the boundary is narrowest relative to an axis. The one or more executable instructions further include instructions for selecting a secondary image from the segmented image that is offset from the primary image by an offset angle and for generating a model from the boundaries in the primary image and the secondary image, and reconstructing a volume representing the object in the model from the plurality of images of the object.

In another embodiment, a method for generating a three-dimensional model is described. The method comprises steps for acquiring a plurality of images of an object and for segmenting one or more of the images to obtain segmented images comprising predominantly pixels that define the object in the image. The method also comprises steps for placing a boundary about the object in the segmented images and selecting a primary image from the segmented images in which the boundary is narrowest relative to an axis. The method further comprises steps for selecting a secondary image from the segmented image that is offset from the primary image by an offset angle, generating a model from boundaries in the primary image and in the secondary image, and reconstructing a volume representing the object in the model from the plurality of images of the object.

In yet another embodiment, a computer-readable medium is described. The computer-readable medium comprises executable instructions for generating a three-dimensional model. The executable instructions include instructions for acquiring a plurality of images of an object and segmenting one or more of the images to obtain segmented images comprising predominantly pixels that define the object in the image. The executable instruction also include instructions for placing a boundary about the object in the segmented images and selecting a primary image from the segmented images in which the boundary is narrowest relative to an axis. The executable instructions also include instructions for selecting a secondary image from the segmented image that is offset from the primary image by an offset angle and generating a model from the boundaries in primary image and in the secondary image, reconstructing a volume representing the object in the model from the plurality of images of the object.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION OF THE INVENTION

The present disclosure focuses on inspection systems and tools that acquire and process images of an object. The inspection systems can include computed-tomography (CT) scanners, ultrasonic scanners, X-ray scanners, and magnetic resonance inspection (MRI) scanners, all of which find use in manufacturing facilities to identify failures, defects, and other imperfections, e.g., in manufactured parts. To facilitate inspection and detection of such defects, the inspection systems acquire a plurality of two-dimensional images and generate three-dimensional models ("models"). In one example, the systems form the models using a boundary positioned on each of the images. The boundary highlights a portion of the two-dimensional image that the system uses to "reconstruct" the two-dimensional images into the model. The embodiments of the systems and methods below define, locate, and position the boundary in each of the two-dimensional images without the need for interaction by an end user (e.g., a technician). Moreover, these embodiments also reduce the amount of computing and memory resources necessary to reconstruct the models from the images.

Figure 1:
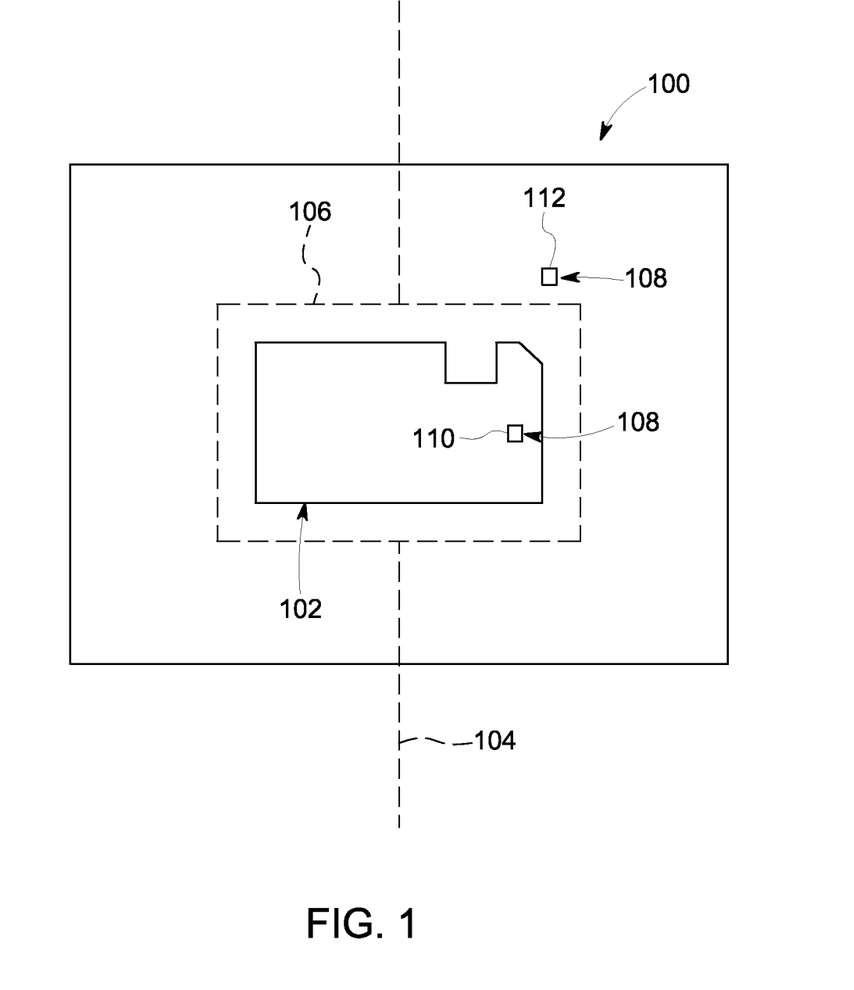
FIG. 1 is an example of a two-dimensional image of an object.

Referring now to the drawings, FIG. 1 depicts a two-dimensional image 100 ("an image 100") that embodiments of the inspection systems can acquire. The image 100 includes an object 102, an axis 104, and a boundary 106 that circumscribes the object 102. The image 100 also includes a plurality of pixels 108 made up of one or more object pixels 110 and one or more non-object pixels 112. The pixels 108 have characteristics such as color or "grey scale" associated therewith. These characteristics are useful to distinguish, e.g., the object 102 from that area that surroundings the object in the image 100.

Figure 2:
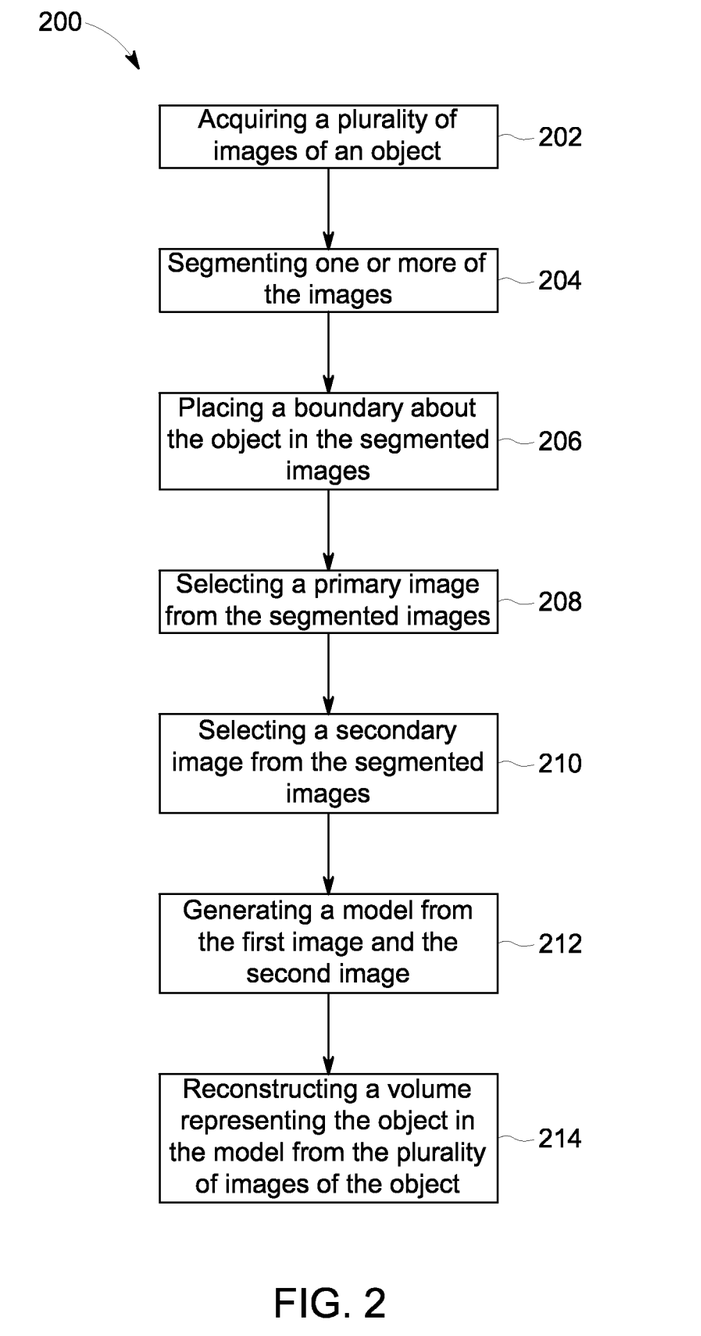
FIG. 2 is a flow diagram of an exemplary embodiment of a method of generating a model from images such as the image of FIG. 1.

FIG. 2 illustrates a flow diagram of an exemplary method 200 for processing a plurality of two-dimensional images (e.g., the image 100 of FIG. 1) to generate a three-dimensional model. Generally executable instructions (e.g., software and/or firmware) can code the steps of the method 200 for implementation on embodiments of the inspection system. As discussed above, implementation as executable instructions can generate the model with limited interaction from an end user.

The method 200 includes, at block 202, acquiring a plurality of the images (e.g., the image 100) of an object and, at block 204, segmenting one or more of the images to obtain segmented images comprising predominantly object pixels (e.g., the object pixels 110). The method 200 also includes, at block 206, placing a boundary (e.g., the boundary 104) about the object in the segmented images. The method 200 further includes, at block 208, selecting a primary image from the segmented images in which the boundary is narrowest relative to an axis (e.g., the axis 106) and, at block 210, selecting a secondary image from the segmented images that is offset from the primary image by an offset angle. The method 200 also includes, at block 212, generating a model from the first image and the second image and, at block 214, reconstructing a volume representing the object in the model from the plurality of images of the object.

Figure 3:
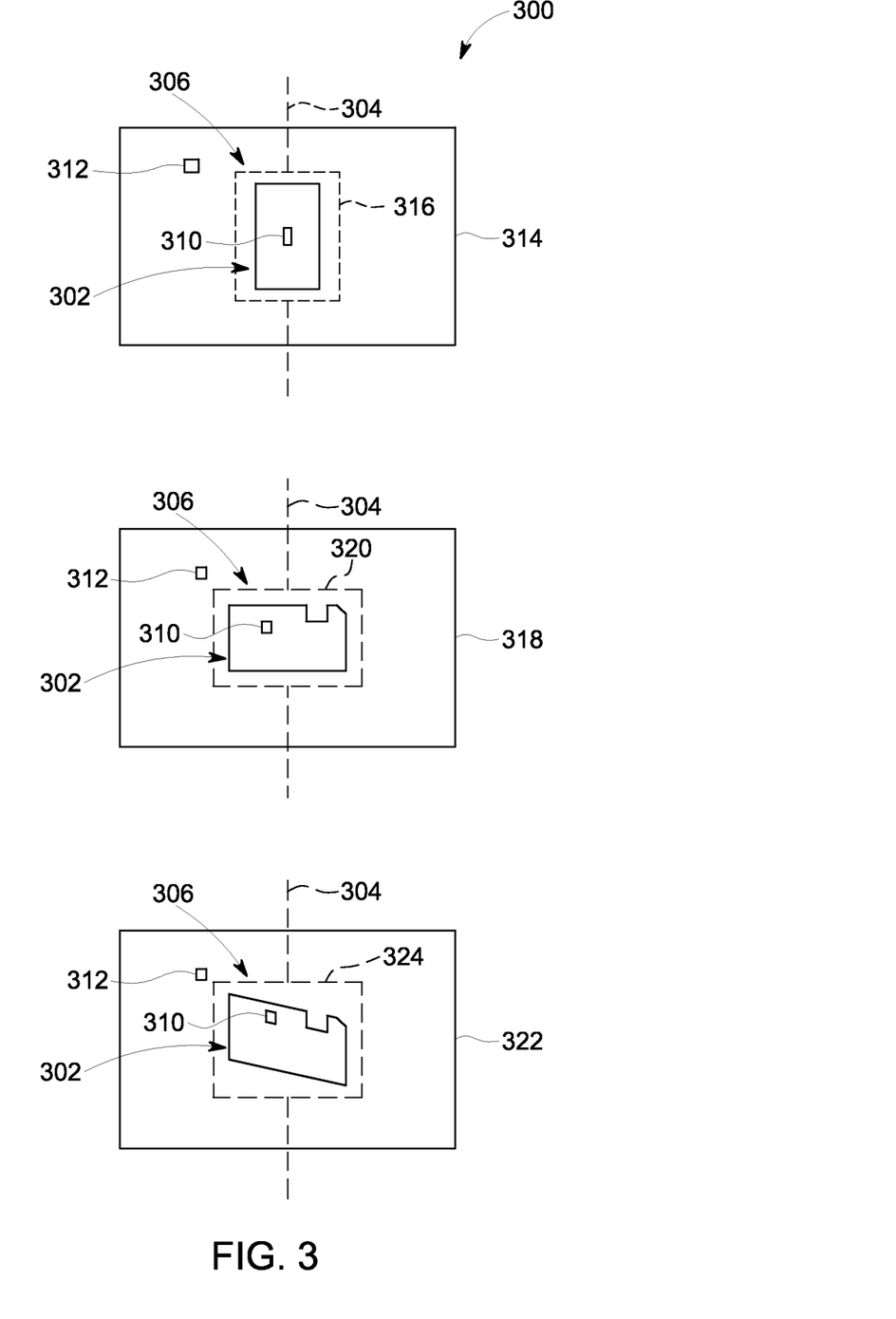
FIG. 3 is an example of two-dimensional images for use with the method of FIG. 2.

With continued reference to FIG. 2, FIG. 3 illustrates an example of a plurality of images 300 of an object 302, wherein the object 302 appears in a different angle relative to an axis 304. Each of the images 300 has a boundary 306, object pixels 310, and non-object pixels 312. The images 302 include a first image 314 with a first boundary 316, a second image 318 with a second boundary 320, and a third image 322 with a third boundary 324.

Acquisition of the images 300 (e.g., at block 202) can include one or more steps for rotating the object 302 and/or rotating part of the inspection system relative to the object 302. Rotation causes the object 302 to appear at different angles in the images 300. The angle varies from 0° to 360°. The number of images 300 that the inspection system acquires corresponds to the incremental changes in the angle of the object 300. For example, the inspection system can rotate the object 302 in increments of 10°. In the example of FIG. 3, only a small selection of images is shown. Here, the object 302 is at about 0° in the first image 314, at about 90° in the second image 316, and at about 135° in the third image 318.

Segmenting the images 300 (e.g., at block 204) describes the process of parsing or selecting from among the pixels 308 in each of the images 300 to form new, segmented images. The resulting segmented images include only those pixels related to the object 302 and/or features of the object 302. To arrive at the segmented images, pixels in the images 300 are distinguished based on color or grey scale of the pixels relative to one another. In one embodiment, pixels with darker scale are part of the object, or are considered object pixels 310, and pixels with relatively lighter scale are part of the surrounding area, or are considered non-object pixels 312 or "air." In another embodiment, the pixels with lighter grey scale are part of the object and are considered as object pixels 310. In still other embodiments, the non-object pixels have grey scales. Non-object pixels 312 and pixels not associated with the object 302 are generally not useful and are not used to generate the three-dimensional model.

Placing the boundaries (e.g., at block 206) occurs automatically, thereby reducing the need for end user interaction. In the present example, the boundary 306 is rectangular, although this disclosure contemplates any shape (e.g., square, triangle, circle, etc.) that effectively circumscribes the object 302. It is noted, however, that more intricate shapes, e.g., that outline the object 302, are more likely to require more complex processes that increase processing time, which the subject matter disclosed herein can avoid. To position the boundary proximate the object 302, the method 300 may include steps for utilizing the color and/or grey scale of the pixels (e.g., the object pixels 310) that remain in the segmented image. These pixels may identify peripheral edges and/or features of the object 302. The method 200 can locate the boundary 306 near these features to more closely match the boundary 306 to the size of the object 302 in the images 300. In one embodiment, the method 200 minimizes the size of the boundary 306 so that the object 302 just fits inside and/or within the boundary 306.

Selection of the primary image (e.g., at block 208) depends on the dimensions of the boundary 306 in each of the images 300. In one embodiment, the method 200 selects one of the images 300 in which the width of the boundary 306 is at its narrowest relative to the axis 304. Among the plurality of images 300 in FIG. 3, the first boundary 316 in the first image 314 is narrower than either the second boundary 320 in the second image 318 or the third boundary 324 in the third image 322. Thus, in the present example, the first image 316 is the primary image.

Selection of the secondary image (e.g., at block 210) identifies one of the images 300 that is offset from the primary image by an offset angle. The offset angle can be any value, although in one embodiment the offset angle is selected so that the object appears in the images selected as the primary image and the secondary image at, respectively, a first angle and a second angle that is about 90° from the first angle. In the present example, where the offset angle is about 90°, the method 200 assigns the second image 318 as the secondary image. In other embodiments, the method 200 may further include a step of selecting additional images from among the plurality of images 300. These additional images may be offset from the primary image by different offset angles. In one example, the method 200 will identify additional images that are offset from the primary image by about 180° and 270°.

Figure 4:
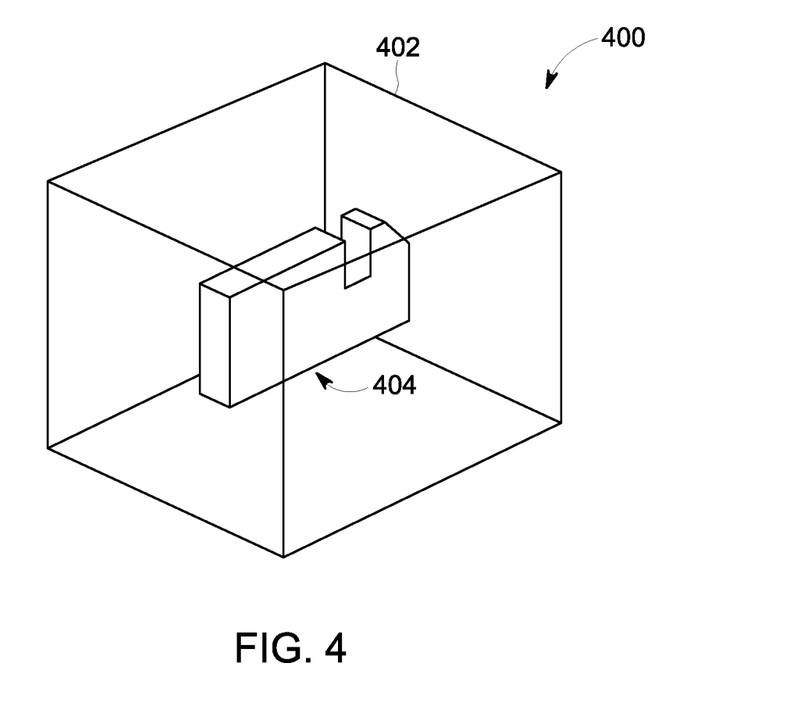
FIG. 4 is an example of a three-dimensional model generated from the images of FIG. 3.

Generating the model (e.g., at block 212) uses the primary image and the secondary image to generate the three-dimensional model. Reconstructing of a volume (e.g., at block 214) generates a volume representing the object from the plurality of images that the inspection system acquires. FIG. 4 illustrates an example 400 that results from implementation of embodiments of the method 200. The example 400 includes a model 402, which in one example has the same size, shape, and characteristics of the boundary found in the primary image and the secondary image. The example also includes a volume 404 of the object. Algorithms for reconstruction of the volume 404 are generally known in the art. Some examples of mathematical methods and algorithms include Feldkamp or helical reconstruction, iterative methods like algebraic methods (e.g., ART, SART, etc.), or statistical methods (e.g., maximum likelihood methods). Although only two images are described in connection with the method 200, illustrative methods can use any number of images. As mentioned above, reconstruction typically requires at least two images that are at least perpendicular to one another. In other illustrative methods, at least four images are used, wherein the images are offset by at least about 90°. In one example, the images include images where the object is at 0°, 90°, 180°, and 270°.

In one embodiment, the images 300 can be generated using an existing volume and/or other images that have been previously acquired. This volume may have a lower resolution or have other characteristics, e.g., pose, that generally limit the amount of data associated therewith. Using a forward projection process on the existing model, images can be generated at different angles. These images are then used to generate the three-dimensional model as discussed above. Forward projection processes and techniques are recognized in the art, and therefore no additional details are provided herein.

Figure 5:
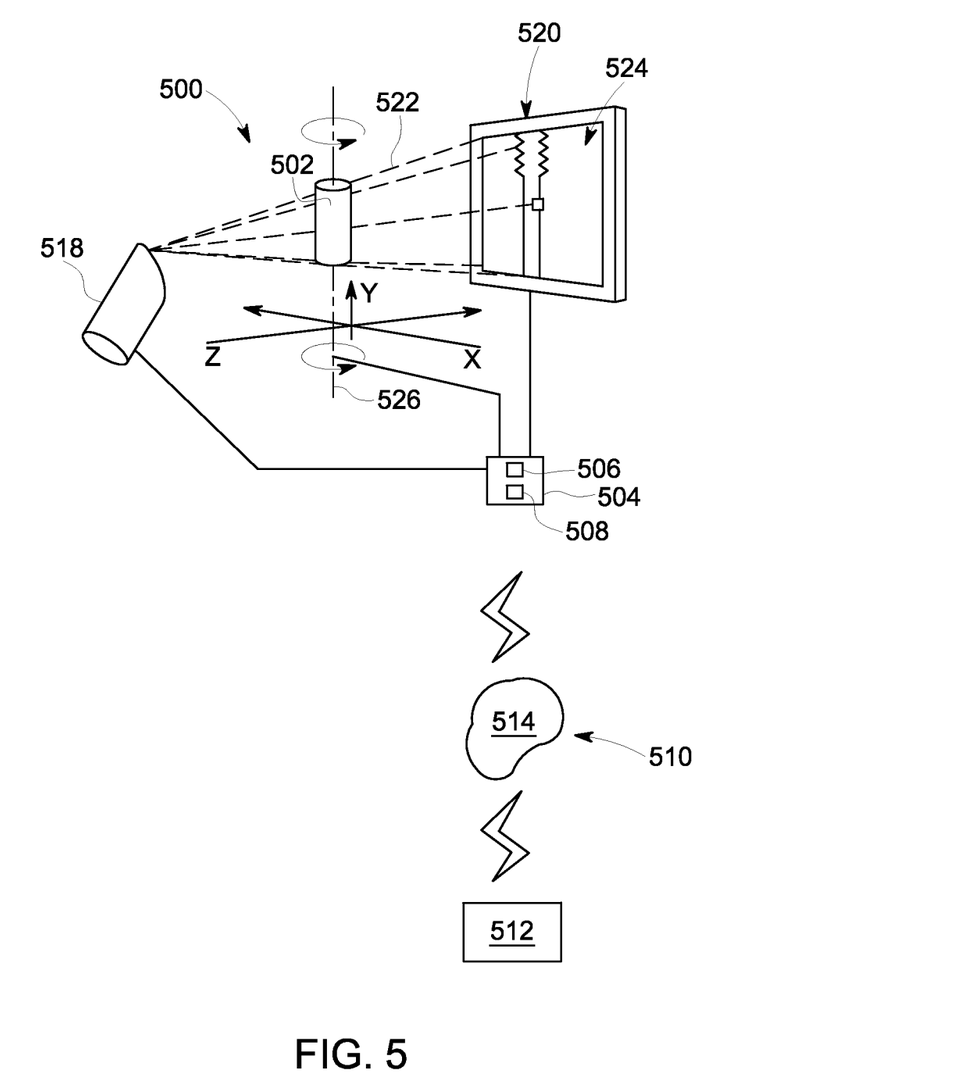
FIG. 5 is a schematic illustration of an exemplary embodiment of an inspection system.

FIG. 5 illustrates an exemplary embodiment of an inspection system 500 that can acquire images of an object 502. The inspection system 500 comprises an apparatus 504 with a processor 506 and memory 508, which can store executable instructions (e.g., software and firmware) that are configured for the processor 506 to execute. The apparatus 504 can be part of a network system 510 with one or more external servers 512 and a network 514 that connects the apparatus 504 to the external servers 512.

The inspection system 500 also comprises a scan device such as an x-ray device to acquire images of the object 502. In one example, the scan device comprises an x-ray source 518 (e.g., an x-ray tube) and an imaging device 520 (e.g., an x-ray detector) in position to receive an x-ray cone 522 that the x-ray source 518 emits. The imaging device 520 forms an image 524 (also "a projection 524"), which can be stored, e.g., on memory 508 or the external servers 512. The scan device may also comprise a manipulator 526 to change the position of the object 502. For example, the manipulator 526 can rotate the object 502. The manipulator 526 can position the object 502 at an acquisition angle, which defines the angular position of the object 502 relative to the x-ray source 518 and/or the imaging device 520. In one embodiment, the manipulator 526 changes the acquisition angle by a step-wise rotation of the object so that the scan device acquires a plurality of the images 524 of the object 502 through a full 360°.

Collectively the apparatus 504 executes high-level logic functions, algorithms, as well as firmware and software instructions. In one example, the processor 506 is a central processing unit (CPU) such as an ASIC and/or an FPGA. The processor 506 can also include state machine circuitry or other suitable components capable of receiving inputs. The memory 508 comprises volatile and non-volatile memory and can be used for storage of software (or firmware) instructions and configuration settings. In some embodiments, the processor 506 and the memory 508 can be contained in a single integrated circuit (IC) or other component. As another example, the processor 504 can include internal program memory such as RAM and/or ROM. Similarly, any one or more of functions of these components can be distributed across additional components (e.g., multiple processors or other components).

In view of the foregoing, embodiments of the systems and methods generate a three-dimensional model using one or more images selected from a plurality of images of an object. A technical effect is to eliminate the need for end user intervention, wherein the selection of the images and placement of the boundary is done automatedly. In one embodiment, the systems and methods identify a primary image by comparing dimensions of a boundary disposed about the object in each of the images. Placement of the boundary occurs during processing of the images rather than by end user manipulation of the image. Using the primary image, the systems and method can identify a secondary image which, in combination with the primary image, can generate the model. Furthermore, using the plurality of images of the object, the systems and methods can generate a volume (of the object) in the model.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "service," "circuit," "circuitry," "module," and/or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be, for example, but not limited to, an electronic, magnetic, optical, electromagnetic, infrared, or semiconductor system, apparatus, or device, or any suitable combination of the foregoing. More specific examples of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An inspection system, comprising:
   an apparatus comprising a processor, a memory coupled to the processor, and one more executable instructions stored on the memory and configured to be executed by the processor, the one or more executable instructions comprising instructions for:
   acquiring a plurality of images of an object;
   segmenting one or more of the images to obtain segmented images comprising predominantly pixels that define the object in the segmented images;
   placing a boundary about the object in the segmented images;
   selecting a primary image from the segmented images in which the boundary is narrowest relative to an axis;
   selecting a secondary image from the segmented images that is offset from the primary image by an offset angle;
   generating a model from the boundaries in the primary image and the secondary image; and
   reconstructing a volume representing the object in the model from the plurality of images of the object.

2. The inspection system of claim 1, further comprising instructions for distinguishing between pixels in the image based on grey scales, wherein the pixels that define the object have pixels with darker grey scales relative to pixels that define an area surrounding the object in the image.

3. The inspection system of claim 1, further comprising instructions for distinguishing between pixels in the image based on grey scales, wherein the pixels that define the object have pixels with lighter grey scales relative to pixels that define an area surrounding the object in the image.

4. The inspection system of claim 1, wherein the primary image and the secondary image are perpendicular to each other.

5. The inspection system of claim 1, wherein the images show the object at angles from 0° to 360°.

6. The inspection system of claim 1, wherein the boundary circumscribes an area that is the smallest area in which the object fits.

7. The inspection system of claim 1, further comprising an external server coupled to the apparatus, wherein one or more of the executable instructions are stored on the external server.

8. The inspection system of claim 1, further comprising a scan device coupled to the apparatus, wherein the scan device acquires the image of the object.

9. The inspection system of claim 8, wherein the scan device comprises an x-ray scanner.

10. The inspection system of claim 8, wherein the scan device comprises a computed-tomography scanner.

11. The inspection system of claim 1, further comprising obtaining the images using forward projection of a previously generated volume.

12. A method for generating a three-dimensional model, said method comprising steps for:
   acquiring a plurality of images of an object;
   segmenting one or more of the images to obtain segmented images comprising predominantly pixels that define the object in the image;
   placing a boundary about the object in the segmented images;
   selecting a primary image from the segmented images in which the boundary is narrowest relative to an axis;
   selecting a secondary image from the segmented image that is offset from the primary image by an offset angle; and
   generating a model from the boundaries in the primary image and the secondary image; and
   reconstructing a volume representing the object in the model from the plurality of images of the object.

13. The method of claim 12, further comprising a step for distinguishing between pixels in the image based on grey scales.

14. The method of claim 12, wherein the boundary circumscribes an area that is the smallest area in which the object fits.

15. The method of claim 12, further comprising a step for acquiring the images using an x-ray scanner.

16. The method of claim 12, further comprising a step for acquiring the images using a computed-tomography scanner.

17. The method of claim 12, wherein the primary image is perpendicular to the secondary image.

18. A non-transitory computer-readable medium comprising executable instructions for generating a three-dimensional model, the executable instructions comprising instructions for:
   acquiring a plurality of images of an object;
   segmenting one or more of the images to obtain segmented images comprising predominantly pixels that define the object in the image;
   placing a boundary about the object in the segmented images;
   selecting a primary image from the segmented images in which the boundary is narrowest relative to an axis;
   selecting a secondary image from the segmented image that is offset from the primary image by an offset angle;
   generating a model from the boundaries in primary image and the secondary image;
   reconstructing a volume representing the object in the model from the plurality of images of the object.

19. The non-transitory computer-readable medium of claim 18, wherein the boundary circumscribes an area that is the smallest area in which the object fits.

20. The non-transitory computer-readable medium of claim 18, further comprising a step for distinguishing between pixels in the image based on grey scales.

* * * * *